(12) United States Patent
Kress

(10) Patent No.: US 7,265,875 B2
(45) Date of Patent: Sep. 4, 2007

(54) HALFTONE SUPER-CELL OPTIMIZATION FOR ARTIFACT REDUCTION

(75) Inventor: William C. Kress, Foothill Ranch, CA (US)

(73) Assignees: Kabushiki Kaisha Toshiba (JP); Toshiba Tec Kabushiki Kaisha (JP)

( * ) Notice: Subject to any disclaimer, the term of this patent is extended or adjusted under 35 U.S.C. 154(b) by 863 days.

(21) Appl. No.: 10/619,385

(22) Filed: Jul. 14, 2003

(65) Prior Publication Data

US 2005/0012964 A1  Jan. 20, 2005

(51) Int. Cl.
*H04N 1/405* (2006.01)
*H04N 1/409* (2006.01)

(52) U.S. Cl. .................. 358/3.06; 358/3.07; 358/3.16; 358/3.19; 358/3.26

(58) Field of Classification Search ............... 358/3.13, 358/3.14, 3.15, 3.16, 3.17, 3.18, 3.19, 535, 358/536
See application file for complete search history.

(56) References Cited

U.S. PATENT DOCUMENTS

| 5,121,198 A | 6/1992 | Maronian |
| 5,815,286 A * | 9/1998 | Matsuba et al. ........... 358/3.19 |
| 6,377,330 B1 | 4/2002 | Vanderbrook et al. |

FOREIGN PATENT DOCUMENTS

EP  1 199 881 A1  4/2002

* cited by examiner

*Primary Examiner*—Thomas D. Lee
(74) *Attorney, Agent, or Firm*—Tucker Ellis & West LLP

(57) ABSTRACT

Artifact reduction is achieved by altering the growth of sub-cells for each super-cell in either a pre-determined or random manner. The means of alteration is selected such that the sum of all the groups equals a halftone value. In another embodiment, the random group is selected by using predetermined patterns which are different among sub-cells, such as different means of constructing a dot. Preferably a different pattern is used in adjacent super-cells. In yet another embodiment, the method selects sub-cells patterns that are not aligned on the super-cell boundaries.

16 Claims, 3 Drawing Sheets

HALFTONE SUPER-CELL OPTIMIZATION FOR ARTIFACT REDUCTION

BACKGROUND OF THE INVENTION

The present invention relates generally to image output devices and more specifically to reducing engine and halftoning artifacts.

Image output systems such as printer, copiers, facsimile machines receive an input and generate an image based on the received input. Often the input has several shades or various degrees of toning, and the image output device tries to imitate the shade or tone while using inks or other media which are much darker than the desired shade by printing on a sheet of paper that is much lighter than the desired shade. One method for obtaining the desired shade is halftoning. Halftoning is the reproduction of grayscale images using dots of a single shade, but varying their size to simulate the different sizes of grey. Laser printers that cannot print different sized dots produce halftones by varying the number of dots in a given area. Halftoning is also used to produce a black and white version of a color document using shades of gray in place of the original colors.

Simple halftoning methods that are well known in the art can have problems with artifacts, which are manifested as undesirable macro effects. For example, a monochrome default halftoning pattern for a 16×16 cell that has 8 sub-cells can provide the illusion of continuous tone from paper white to device black. If all of the 8 sub-cells grow the same so the code-values for all sub-cells are identical macro effect of equal dot growth can produce horizontal, vertical, slanted line artifacts or repeated pattern artifacts. Halftoning methods which use patterns, often in conjunction with code-values may still exhibit macro effects because of the continuous repetition of the same pattern.

Thus, a need exists for a halftoning method that eliminates line patterns or any other artifact patterns or other macro effects.

BRIEF SUMMARY OF THE INVENTION

In view of the aforementioned needs, the invention contemplates in one embodiment a method that within a super-cell, the sub-cell growth is randomized. For example, if a 50 percent halftone is desired, one sub-cell may have 50 percent of its cells grown, the next sub-cell may have 48 percent of its sub-cells grown, and the next super-cell may have 52 percent of the sub-cells grown. Thus the average value of the super-cells if 50 percent.

In another embodiment of the present invention, sub-cells are selected into groupings such that the groupings cross the boundaries of the super-cells. The sub-cells within each group are then grown either by using a random bias value for each grouping, or using predetermined biases for each grouping. The groupings may also vary in size. For example one grouping may contain 64 sub-cells while another grouping only has 16. By using groupings that are not aligned on super-cell boundaries, one part of a super-cell may be increasing in growth while the other part of the super-cell is decreasing in growth with a net result of increasing density.

As those skilled in the art can readily appreciate, the present invention may be implemented in software, hardware or a combination thereof. While the description herein is directed to black and white image or grayscale images, the present invention is equally adaptable to color printers.

Still other objects of the present invention will become readily apparent to those skilled in this art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without from the invention. Accordingly, the drawing and descriptions will be regarded as illustrative in nature and not as restrictive.

BRIEF DESCRIPTION OF THE SEVERAL VIEWS OF THE DRAWING

The accompanying drawings incorporated in and forming a part of the specification, illustrates several aspects of the present invention, and together with the description serve to explain the principles of the invention. In the drawings:

FIG. 5 is an example of a super-cell grid with random sub-cells biased in each super-cell; and FIG. 6 is an example of a super-cell grid using a combination of random patterns and a random code-value for each super-cell.

DETAILED DESCRIPTION OF INVENTION

Throughout this description, the preferred embodiment and examples shown should be considered as exemplars, rather than limitations, of the present invention.

The present invention contemplates various methods of halftoning for artifact reduction. Artifact reduction may be accomplished by dispersing the growth of sub-cells so that the sub-cells do not grow in the same manner and are constrained by super-cell boundaries. One method is by growing sub-cells based on a random value for each super-cell. Another method is growing sub-cells based on random patterns, preferably in a manner such that adjacent super-cells have different patterns. Another method is to disperse the growth of sub-cells are grouped wherein the groupings are not constrained by super-cell boundaries.

Figure 3:
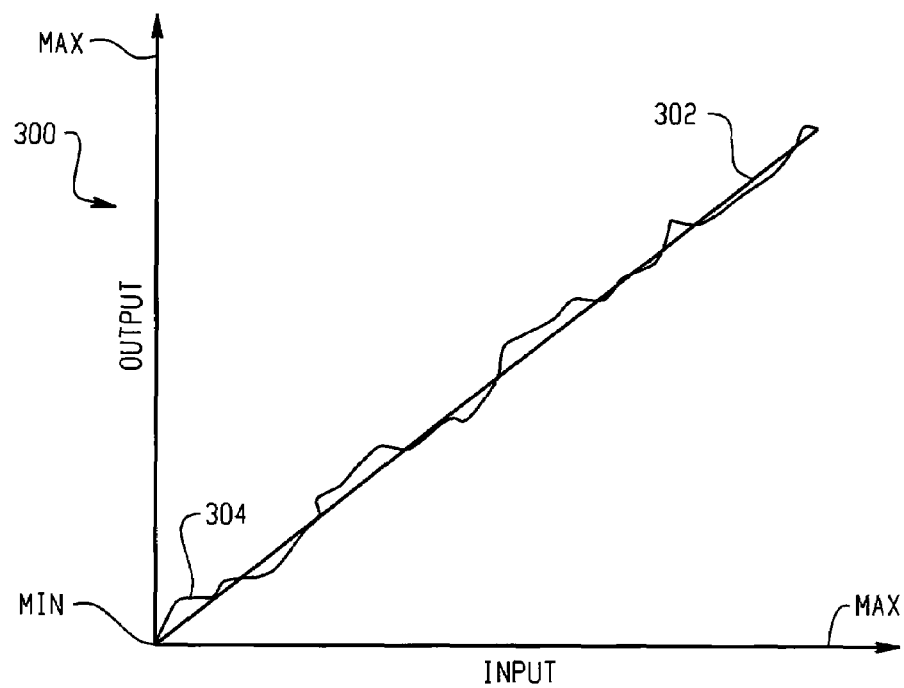
FIG. 3 is a graph illustrating an example of output sub-cell growth based on input.

Referring to FIG. 3 there is shown a graph illustrating the relationship of the input to an image output device to the output. The bottom left of the graph represent minimum input and output, which would typically be the case where no ink or media is used and the output is just plain paper. The right side of the input axis is the maximum input, or typically complete black input and the maximum output is the upper end of the axis for the output. Line 302 is the case where the input is mapped perfectly to the output. However, line 304 illustrates a randomized growth pattern for the system described in this invention. As can be seen by 304, the growth is, at some places, slower than that of line 302 and at other places, faster. Other irregular growth patterns similar to 304 can be implemented for other sub-cells.

Figure 1:
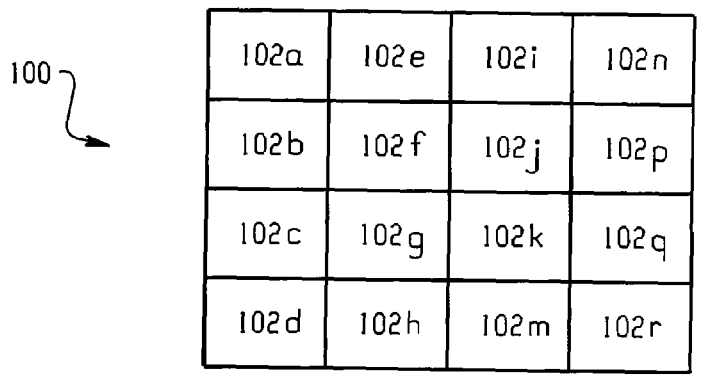
FIG. 1 is an example of a super-cell grid composed of sixteen sub-cells.

Referring to FIG. 1, there is shown a super-cell 100 that is comprised of sixteen sub-cells, 102*a*, 102*b*, 102*c*, 102*d*, 102*e*, 102*f*, 102*g*, 102*h*, 102*i*, 102*j*, 102*k*, 102*m*, 102*n*, 102*p*, 102*q* and 102*r*. While the illustrations in this application use super-cells of 16 sub-cells, as those skilled in the art can readily appreciate the super-cells may comprise any number of sub-cells, which ordinarily would be an integer multiple of 16 such as 16, 64, 128 or 256 sub-cells per super-cell. The methods described herein for the 16 sub-cell super-cell are easily adaptable to other size super-cells.

Halftones are produced by biasing a certain number of sub-cells of the super-cell. For example for a 50 percent halftone, eight of the sixteen sub-cells may be biased. The eight sub-cells may be the top half of the super-cell, e.g. sub-cells 102a, 102e, 102i, 102n, 102b, 102f, 102j and 102p, the bottom half of the super-cell, e.g. sub-cells 102c, 102g, 102k, 102q, 102d, 102h, 102m and 102r, the left-half of the super-cell, e.g. 102a, 102b, 102c, 102d, 102e, 102f, 102g and 102h, the right-half of the super-cell, e.g. 102i, 102j, 102k, 102m, 102n, 102p, 102q and 102r, alternate rows of the super-cell, e.g. cells 102a, 102e, 102i, 102h, 102c, 102g, 102k and 102q or alternate columns of the super-cell, e.g. cells 102a, 102b, 102c, 102d, 102i, 102j, 102k and 102m. One method contemplated by use with the present invention is to use random sub-cells of the super-cell, for example for a 50% halftone sub-cells 102a, 102c, 102f, 102h, 102k, 102j, and 102n and 102r could be used. Another method contemplated by the present invention is to use a pattern for the super-cell such as a square wave, thus for a 50% halftone sub-cells 102d, 102c, 102b, 102a, 102e, 102i, 102j and 102k may be biased.

Figure 2:
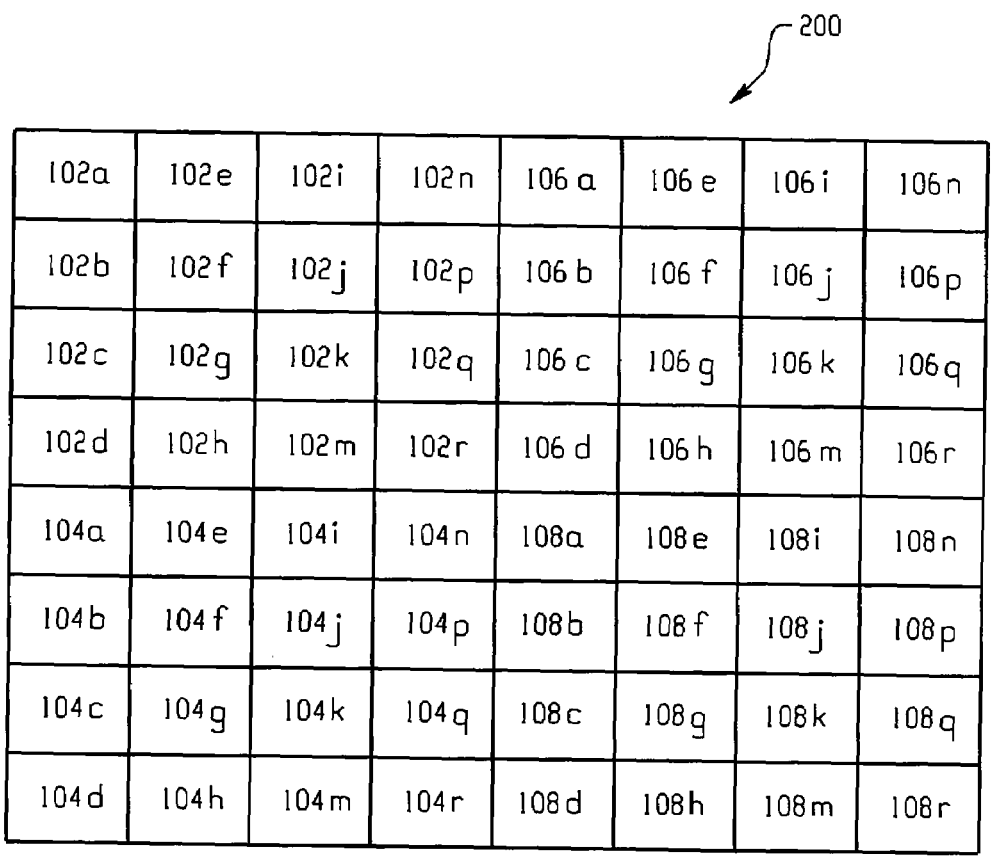
FIG. 2 is an example of four super-cells, each super-cell with sixteen sub-cells.

Referring now to FIG. 2 there is shown a grid 200 of four super-cells 200. The first super-cell is comprised of sub-cells, 102a, 102b, 102c, 102d, 102e, 102f, 102g, 102h, 102i, 102j, 102k, 102m, 102n, 102p, 102q and 102r. The second super-cell is comprised of sub-cells sub-cells, 104a, 104b, 104c, 104d, 104e, 104f, 104g, 104h, 104i, 104j, 104k, 104m, 104n, 104p, 104q and 104r. The third super-cell comprises sub-cells 106a, 106b, 106c, 106d, 106e, 106f, 106g, 106h, 106i, 106j, 106k, 106m, 106n, 106p, 106q and 106r. The fourth super-cell comprises sub-cells 108a, 108b, 108c, 108d, 108e, 108f, 108g, 108h, 108i, 108j, 108k, 108m, 108n, 108p, 108q and 108r.

Figures 5, 6:
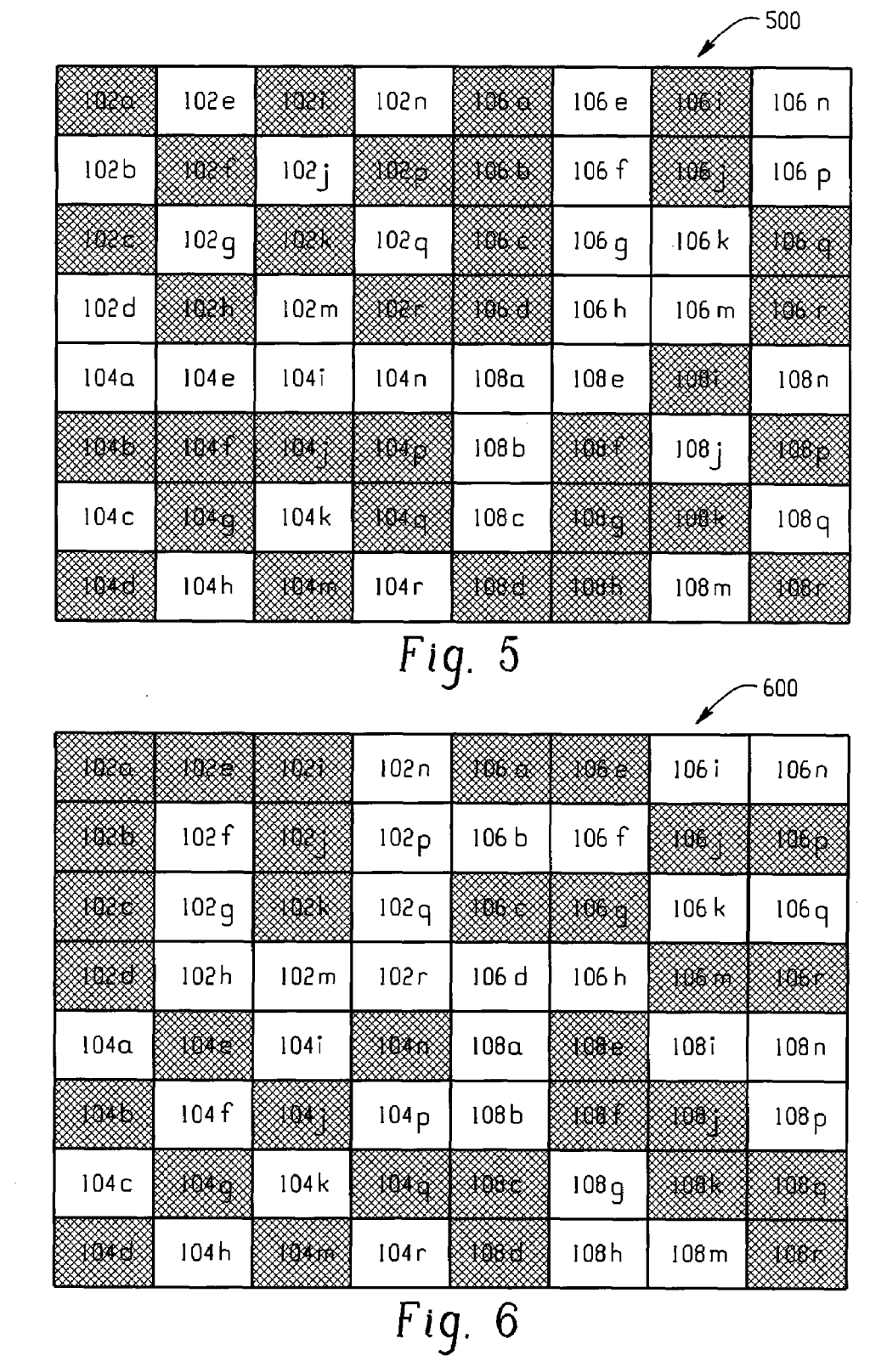

Referring now to FIG. 5, there is illustrated an example of one method of the present invention. For this example, it is desired that the halftoning is 50%. One embodiment of the present invention contemplates using random patterns to obtain the 50% halftone wherein each super-cell has 50% of its sub-cells biased. For example, in FIG. 5, sub-cells 102a, 102c, 102f, 102h, 102i, 102k, 102p and 102r of the first super-cell are biased. For the second super-cell, sub-cells 104b, 104d, 104f, 104g, 104j, 104m, 104p and 104q are biased. For the third super-cell, sub-cells 106a, 106b, 106c, 106d, 106i, 106j, 106q and 106r are biased. For the fourth super-cell, sub-cells 108d, 108f, 108g, 108h, 108i, 108k, 108p and 108r are biased. For this particular embodiment, each super-cell has 50% of the sub-cells biased. Preferably for each super-cell, the adjacent super-cells have different random sub-cells biased.

Randomization can be further enhanced by causing each sub-cell to grow in a different pattern. For example, one sub-cell can grow as a cluster dot, another can grow as an elliptical dot, etc.

Referring now to FIG. 6 there is yet another embodiment of the present invention. This embodiment uses a combination of random sub-cell biasing along with a random number of sub-cells per super-cell. In this example, a 50% halftone is desired. The first super-cell has nine sub-cells biased, 102a, 102b, 102c, 102d, 1022i, 102j, 102k, 102m and 102q. The second super-cell has seven sub-cells biased, 104e, 104f, 104g, 104h, 104p, 104q, 104r. The third super-cell has only four sub-cells biased, 106b, 106f, 106j and 106p, while the fourth super-cell has twelve sub-cells biased, 108a, 108b, 108c, 108e, 108f, 108g, 108i, 108j, 108k, 108n, 108p and 108q. While none of the super-cells have a 50% halftone, the aggregate of all four super-cells is that all 50% of the sub-cells are biased. Furthermore the first and second super-cells use a vertical pattern whereas the third and fourth super-cell are using a horizontal pattern.

Figure 4:
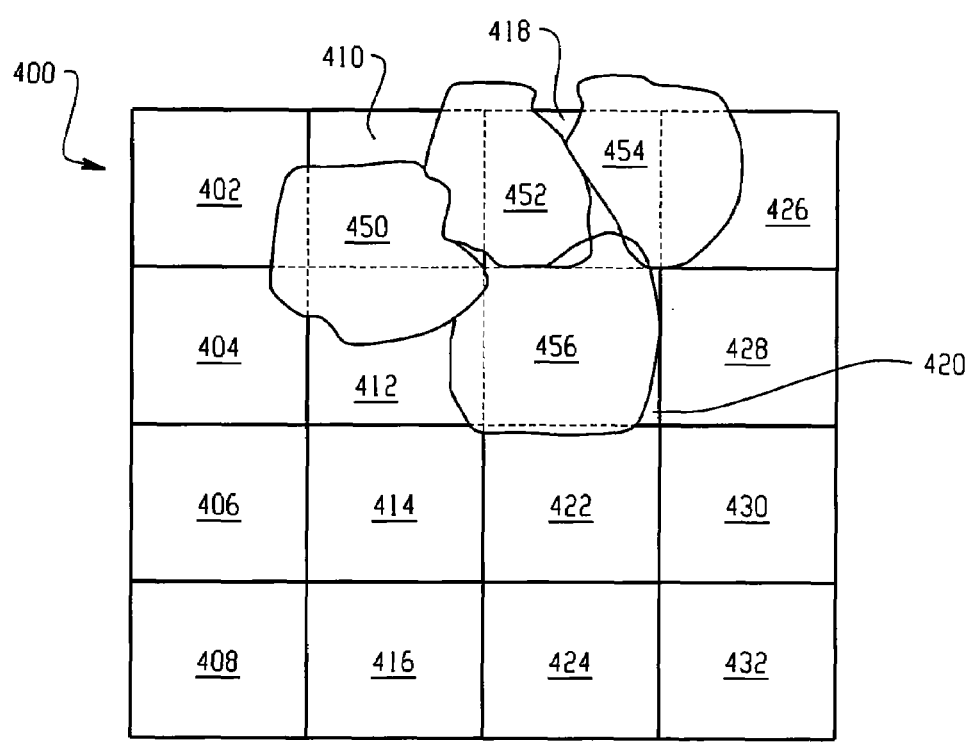
FIG. 4 is an embodiment wherein sub-cells groupings are made that cross super-cell boundaries.

Referring now to FIG. 4 there is illustrated another embodiment of the present invention. In this embodiment, the grid 400 comprises super-cells 402, 404, 406, 408, 410, 412, 414, 416, 418, 420, 422, 424, 426, 428, 430 and 432. In this embodiment, the growth of pixels are not aligned on cell boundaries. For example a first grouping of sub-cells 450 has sub-cells from super-cell 402, 410, 404 and 412. The second grouping of sub-cells 452 has sub-cells from super-cells 410, 418 and other super-cells off the grid 400. The third grouping of sub-cells 454 has sub-cells from super-cells 418, 430 and other super-cells off the grid 400. A fourth grouping of sub-cells 456 has sub-cells from super-cells 412, 414, 420 and 422. It is further contemplated that the groupings 450, 452, 454 and 456 may be of varying sizes or numbers of super-cells as well as varying shapes.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of the ordinary skill in the art to utilize the invention in various embodiments and with various modifications as are suited to the particular use contemplated. All such modifications and variations are within the scope of the invention as determined by the appended claims when interpreted in accordance to the breadth to which they are fairly, legally and equitably entitled.

What is claimed is:

1. A method of Halftone Super-cell optimization for artifact reduction, comprising the steps of:
   receiving a halftone value;
   selecting a group of super-cells, each super-cell having a plurality of sub-cells;
   grouping sub-cells such that at least one group of sub-cells contains cells from at least two super-cells;
   randomly selecting sub-cells based on a code value for each super-cell; and
   biasing each grouping of sub-cells based on its randomly selected code-value;
   wherein the total of the selected group of sub-cells for the group of super-cells equals the halftone value.

2. The method of claim 1 wherein each grouping of sub-cells has a different code-value than all adjacent groupings of super-cells.

3. The method of claim 1 wherein the randomly selected group of sub-cells are selected based on a predetermined pattern.

4. The method of claim 3 wherein the overall pattern of growth within a group of sub-cells can differ in each individual sub-cell.

5. An image output apparatus, comprising:
   means adapted to receive a halftone value;
   means adapted to select a group of super-cells, each super-cell having a plurality of sub-cells, wherein each super-cell has a different number of randomly selected sub-cells than all adjacent sub-cells;
   means adapted to randomly select a code-value for each super-cell; and means adapted to bias the sub-cells of each super-cell based on its randomly selected code-value;

wherein the total of the randomly selected for the group of super-cells equals the halftone value.

6. An image output apparatus, comprising:

means adapted to receive a halftone value;

means adapted to select a group of super-cells, each super-cell having a plurality of sub-cells;

means adapted to use a pattern to select sub-cells from each super-cell, wherein the pattern is selected from the group consisting of a square wave, a sine wave, a crossing pattern, a vertical pattern and a horizontal pattern; and means adapted to bias the selected group of sub-cells;

wherein the total of the selected group of sub-cells for the group of super-cells equals the halftone value.

7. A image output apparatus, comprising:

means adapted to receive a halftone value;

means adapted to select a group of super-cells, each super-cell having a plurality of sub-cells;

means adapted to group sub-cells such that at least one group of sub-cells contains cells from at least two super-cells;

means adapted to randomly select a group of sub-cells from each grouping of sub-cells; and means adapted to bias the randomly selected group of sub-cells;

wherein the total of the selected group of sub-cells for the group of super-cells equals the halftone value.

8. The image output apparatus of claim 7 wherein each grouping of sub-cells has a different number of randomly selected sub-cells than all adjacent groupings of super-cells.

9. The image output apparatus of claim 7 wherein the randomly selected group of sub-cells are selected based on a predetermined pattern.

10. The image output apparatus of claim 9 wherein the predetermined pattern for each grouping of sub-cells is selected from the group consisting of a square wave and a sine wave.

11. A computer program product having a computer readable medium having computer program logic recorded thereon for halftone super-cell optimization for artifact reduction, comprising:

means adapted to receive a halftone value;

means adapted to select a group of super-cells, each super-cell having a plurality of sub-cells, wherein each super-cell has a different number of randomly selected sub-cells than all adjacent super-cells;

means adapted to randomly select a group of sub-cells from each super-cell; and means adapted to bias the randomly selected group of sub-cells;

wherein the total of the selected group of sub-cells for the group of super-cells equals the halftone value.

12. A computer program product having a computer readable medium having computer program logic recorded thereon for halftone super-cell optimization for artifact reduction, comprising means adapted to receive a halftone value;

means adapted to select a group of super-cells, each super-cell having a plurality of sub-cells;

means adapted to use a pattern to select sub-cells from each super-cell, wherein the pattern is selected from the group consisting of a square wave, a sine wave, a crossing pattern, a vertical pattern and a horizontal pattern; and means adapted to bias the selected group of sub-cells;

wherein the total of the selected group of sub-cells for the group of super-cells equals the halftone value.

13. A computer program product having a computer readable medium having computer program logic recorded thereon for halftone super-cell optimization for artifact reduction, comprising:

means adapted to receive a halftone value;

means adapted to select a group of super-cells, each super-cell having a plurality of sub-cells;

means adapted to group sub-cells such that at least one group of sub-cells contains cells from at least two super-cells;

means adapted to randomly select a group of sub-cells from each grouping of sub-cells; and means adapted to bias the randomly selected group of sub-cells;

wherein the total of the selected group of sub-cells for the group of super-cells equals the halftone value.

14. The computer readable medium of instructions of claim 13 wherein each grouping of sub-cells has a different number of randomly selected sub-cells than all adjacent groupings of super-cells.

15. The computer readable medium of instructions of claim 13 wherein the randomly selected group of sub-cells are selected based on a predetermined pattern.

16. The computer readable medium of instructions of claim 15 wherein the predetermined pattern for each grouping of sub-cells is selected from the group consisting of a square wave and a sine wave.

\* \* \* \* \*